United States Patent [19]

De Vita et al.

[11] Patent Number: 4,547,880
[45] Date of Patent: Oct. 15, 1985

[54] COMMUNICATION CONTROL APPARATUS FOR DIGITAL DEVICES

[75] Inventors: Joseph P. De Vita, Laguna Hills; Thomas J. Mulder, San Juan Capistrano; Kenneth J. O'Mohundro, Santa Ana; Leslie J. Wellington, Villa Park, all of Calif.; Wayne R. Deeter, Elkton, Oreg.; Larry D. Sternaman, San Juan Capistrano, Calif.

[73] Assignee: Able Computer, Costa Mesa, Calif.

[21] Appl. No.: 551,292

[22] Filed: Nov. 14, 1983

Related U.S. Application Data

[63] Continuation-in-part of Ser. No. 494,340, May 13, 1983.

[51] Int. Cl.$^4$ .......................... H04Q 11/04; H04J 3/00
[52] U.S. Cl. .......................................... 370/91; 370/58; 370/85; 370/96
[58] Field of Search ................ 370/85, 80, 92, 91, 370/29, 89, 16, 58, 96

[56] References Cited

U.S. PATENT DOCUMENTS

| | | | |
|---|---|---|---|
| 4,093,823 | 6/1978 | Chu | 370/80 |
| 4,242,749 | 12/1980 | Takezoe | 370/85 |
| 4,385,382 | 5/1983 | Goss et al. | 370/96 |

Primary Examiner—Douglas W. Olms
Assistant Examiner—Curtis Kuntz
Attorney, Agent, or Firm—Don A. Hollingsworth

[57] ABSTRACT

Communication control apparatus for interconnecting one or more digital devices to one or more other digital devices, or more specifically for interconnecting a moderate to large number of user terminals, main frame computer systems, minicomputers, remote digital devices, and the like, using some of the concepts inherent in statistical multiplexers, intelligent switches, and local area network devices, all implemented in a compact configuration to produce a flexible and cost effective approach to data communication interfaces. The communication control apparatus replaces and simplifies the actual terminal connections from the computer interface(s) and then adds substantial system enhancements for the manager while retaining software and protocol transparency. A local communication bus is provided for routing of data and control signals internally of the control apparatus. A plurality of synchronous or asynchronous line adapters transreceives corresponding synchronous or asynchronous serial data inputs on a similar corresponding plurality of line ports from respective device terminals, the input data being selectively applied to the local communication bus. A high speed data composite transmission line is provided for transreceiving data between the control apparatus and a remote digital device, such as a host computer. A link interface at the local end of the composite transmission line provides a communication path between the local communication bus and the composite transmission line. A digital device (computer) interface adapter at the remote end of the composite transmission line communicates data between the high speed composite transmission line and a processor bus of the digital device, and a supervisor and bus control device provides source and destination routing control of data on the local communication bus between the line adapters and the link interface.

15 Claims, 13 Drawing Figures

Fig 7 MULTI-LINE ADAPTER

Fig 8 SUPERVISOR & BUS CONTROL

Fig. 10 (PRIOR ART)

COMMUNICATION CONTROL APPARATUS FOR DIGITAL DEVICES

This application is a continuation in part of Ser. No. 494,340 filed May 13, 1983.

BACKGROUND OF THE INVENTION

1. Field of the Invention

This invention relates to the field of communication control for interconnecting one or more digital devices to one or more other digital devices. More specifically, the invention concerns an apparatus for interconnecting a moderate to large number of user terminals, computer systems, remote digital devices, and the like, using some of the concepts inherent in statistical multiplexers, intelligent switches, and local area network devices, all implemented in a compact configuration to produce a flexible and cost effective approach to data communication interfaces. The communication control apparatus of this invention replaces and simplifies the actual terminal connections from the computer interface(s) and then adds substantial system enhancements for the manager while retaining software and protocol transparency. In this description, the term "digital device" will refer to any apparatus whose communication ports transmit and/or receive digital data, such as mainframe computers, mini computers, terminals, modems, printers, displays, and like devices with digitally formatted interfaces.

2. Description of the Prior Art

As telecommunications companies, computer firms, and end user requirements grow, the need for improved data communication within a computer system expands at the same or even greater rate. Many of the problems associated with prior art systems, as they are assembled or modified for expansion, result from the increased utilization of many computer networks, a significant shift to arrangements involving separate clusters of terminals, the need for placing large numbers of terminals at remote locations from the computer room, and broader usage of common carriers (i.e. the telephone companies) for data transmission.

It is common to find communication networks associated with the mainframe user composed of cluster controllers to which groups of terminals are connected, with the data being transferred from the controller to the control site via a high-speed composite line. Unfortunately, such prior art controllers were not available to minicomputer users whose systems, because of their development as on-line rather than batch processing systems, lacked the front-end processors, cluster controllers, and special communications protocols of their larger counterparts.

Typically, a system involving a minicomputer with a number of terminals distant from the control site would simply be interconnected using individual leased lines. Certain data concentrators, widely known as statistical multiplexers, have recently become available in an attempt to minimize the line costs involved in communicating along a multiline network between a computer interface and the cluster of user terminals. Such statistical multiplexers accommodate a large number of lines from the computer interface and communicate the information down a single high-speed composite line to be restored to a multiline arrangement at the other end. A statistical multiplexer, however, is merely a means for concentrating signal information down to a single high-speed transmission line between two points which may be spaced perhaps one kilometer apart. At each transmit/receive end of the high-speed composite line, complex and expensive signal handling apparatus is required to make the requisite conversions between multiline-to-single line and single line-to-multiline transformations. Unless a considerable number of lines are involved in the system, it is possible that the cost of statistical multiplexer devices would not be offset by the saving in line costs.

A mainframe user may also have a network to manage consisting of a large quantity of terminals and a number of host computers. Each user has a need to gain access to the different host computers via their own terminal. At the same time, there is a need in such systems for operations managers to control and manage the network. To meet these requirements, digital data switching systems have recently become commercially available. Such switching systems permit the interconnection of more terminals to the system than there are ports available on the computers, and to help manage the system the microprocessor-based design permits supervisory control, queueing, event logs, statistics, and the like. Such systems, unfortunately, are expensive, often costing more than the entire minicomputer system itself. Moreover, since all lines from all devices must route through the switcher, more often than not the number of lines in a system were greatly increased, not decreased, in favor of the improved communication control. Switching networks have other significant drawbacks: they nearly double the number of interconnects in a system, increasing the chances for mechanical breakdown; and they cannot establish two-way communication between all devices, resulting in primary devices being able to select any secondary device but with secondary devices being unable to select destinations. Such systems did, however, establish the basic guidelines for intelligent switching systems which have become more attractive as the price of minicomputers, particularly superminicomputers, rises. Still, below 64 lines of network control via an intelligent switch is a luxury most minicomputer users cannot afford.

Local area network devices, defined as intelligent switching systems which are able to be interconnected and placed remotely while being controlled from a single source, introduced the concepts of redundancy and distributed architecture. These concepts have been of substantial attraction in recent years to users of a minicomputer data communications system. Again, however, the cost of such devices, designed for general application, is prohibitive to the minicomputer user.

While multi-terminal systems have grown considerably in recent years, and although certain options are commercially available for enhancing such systems, such as the statistical multiplexers, intelligence switching systems, and local area networks discussed above, the basic minicomputer data communications multiplexer has undergone little change other than reduction of physical size and cost. Thus, there is clearly a need for an improved and cost effective computer/digital data communications multiplexer which can support a large number of terminal connections, which allows a terminal port connection to be placed at a long distance from a host computer adapter, that is expandable in function and in number of terminal connections, that may permit communication to more than one host computer, that permits intercommunication between any two or more digital devices, and that provides supervisor and printer port capability for permitting on-line configuration capability and a log of all connections. The present invention satisfies this need.

BRIEF SUMMARY OF THE INVENTION

The above-noted problems and shortcomings of prior art devices are overcome with the present invention by providing an improved "communication control apparatus" for interconnecting one or a plurality of digital devices to other digital devices. The apparatus comprises a plurality of synchronous or asynchronous line adapters, a link interface, and a supervisor and bus control device, all interconnected by a local communication bus for routing and distribution of data and control signals internally of the control apparatus. A high speed data composite transmission line is provided for trans-receiving data between the control apparatus and a remote digital device. The local end of the composite transmission line is coupled to the link interface, while the remote end of the composite transmission line is coupled to a digital device interface adapter for communicating data directly to a processor bus of the remote digital device, e.g., a host computer. The supervisor and bus control device provides source and destination routing control of data on the local communication bus between the line adapters and the link interface. The choice of synchronous or asynchronous for the line adapters is a function of the specific application for the invention.

In a preferred embodiment of the invention, a plurality of asynchronous line adapters are assembled into a single asynchronous multi-line adapter card, each such line card preferably serving 8 separate terminals at its terminal port connector. The other end of the asynchronous multi-line adapter card is coupled to the local communication bus. The apparatus may be expanded to include additional asynchronous multi-line adapter cards, each accommodating 8 terminals at its terminal port connector. In a typical complete system, but not so limited, as many as 8 asynchronous multi-line adapter cards may be connected to the local communication bus, thereby providing access to a host computer, for example, for as many as 64 terminals, in the basic configuration of the invention. The high speed composite transmission line can have a length up to 1 km without the need for modem assist. The composite transmission line defines a 1 Mbps HDLC protocol data link.

Another expansion possibility with the present invention concerns the ability to add a second link interface connected to the local communication bus and having a pair of high speed data composite transmission lines for communication to the same or other digital devices, e.g. the same or other host computers, or to the link interfaces of additional communication control apparatuses, thereby expanding the number of possible terminals to 128, or permitting, for example, 64 terminals to communicate with two host computers.

For ease of understanding and simplification of description of description of the invention, as used hereinafter, the term "node" will identify the portion of the communication control apparatus comprising the asynchronous multi-line adapters, the link interface, and the supervisor and bus control device. As thus configured, the complete communication control apparatus, in its simplest form, would be defined by a single node and a single computer interface for host adapter. The node thus couples the terminal ports functionally with the local end of the composite transmission line, and the host adapter couples the composite transmission line to the processor bus of the host computer.

To complete the communication control apparatus function, the supervisor and bus control has a pair of asynchronous ports, one communicating with n operator control terminal and the other communicating with a printer. Obviously, more than two asynchronous ports may be employed.

While the system can be expanded as indicated above by the additional multi-line adapter cards and additional link interface, an additional expansion of the system can involve incorporating a store and forward processor in the supervisor and bus control device. By the addition of a small processor and memory, the system is capable of performing a store and forward function of the messages in the local communication bus. Accordingly, at later time, when it is convenient and traffic permits, the stored information is routed through to the link interface to the host computer.

Since, in a preferred arrangement, each link interface has the possibility of two high speed composite transmission lines, the system may incorporate a second host adapter in the same host computer for redundancy purposes or can be routed to a second host computer through its separate host adapter, or alternatively can be routed to the link interface of a second node to provide expansion limited only by the physical constraints of the housing for the apparatus and the efficiency of the system as additional nodes are connected.

It can thus be appreciated that the invention consolidates specific capabilities of various data processing devices to produce an effect that is useful for a large variety of applications and which has heretofore been unavailable as a packaged unit. The particular architectural concept involved, the use of a long composite transmission link, the configuration of the internal communication bus, the expansion capabilities, the size, style, price, and type of product for such a functionally consolidated piece of hardware results in an unexpectedly low cost per line figure.

DETAILED DESCRIPTION OF THE PREFERRED EMBODIMENTS

Figure 1:
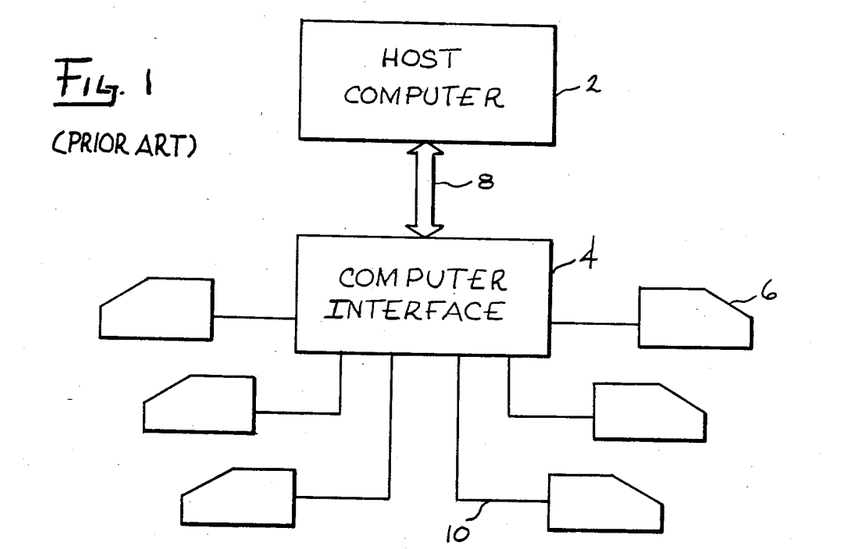
FIG. 1 shows a simple prior art configuration of a host computer with a typical terminal connection to the computer interface.

FIG. 1 is illustrative of a very basic multi-terminal/-computer system. A host computer 2 is connected to a computer interface 4 via a multi-line cable 8. The computer interface 4 provides ports 10 for a plurality of terminals 6 and provides the emulation necessary to communicate between the terminals and the host computer. Typically, such a crude computer interface provides as many communication paths in cable 8 as there are terminals 6, and the maximum distance between the host computer 2 and the terminals 6 is on the order of 50 to 100 feet.

Figure 2:
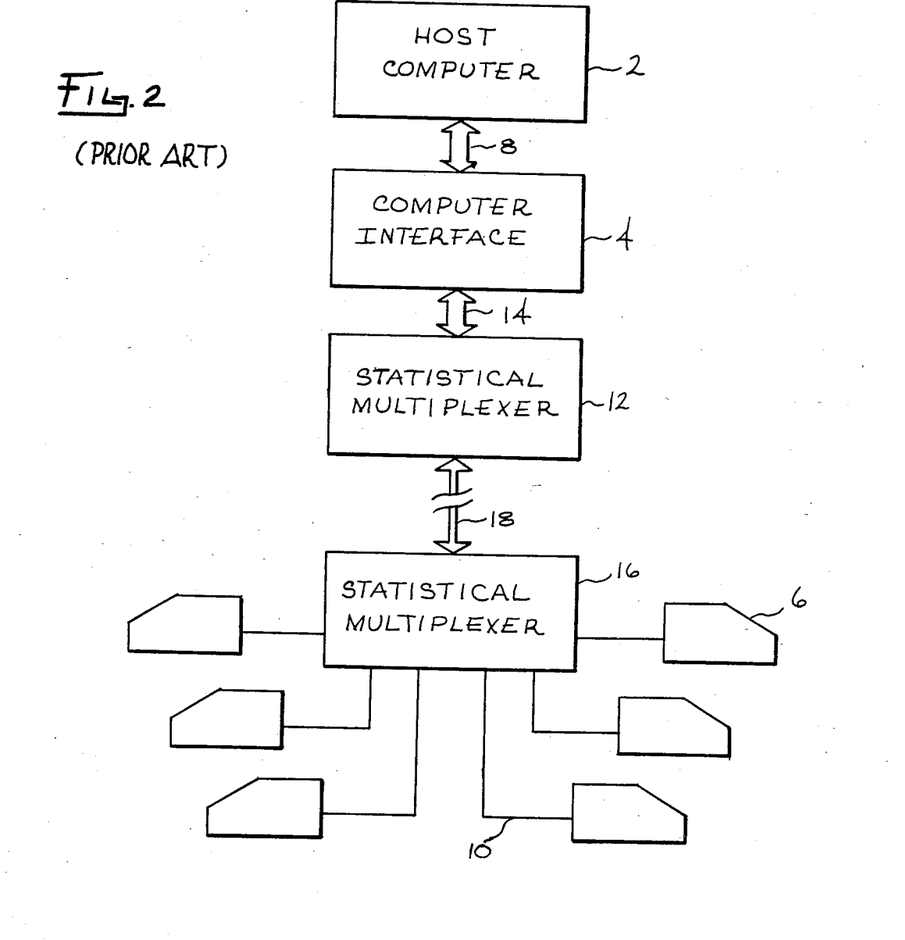
FIG. 2 shows a prior art connection similar to that of FIG. 1 with the addition of a statistical multiplexer for remoting the cluster of terminals.

FIG. 2 is an expansion of the prior art arrangement of FIG. 1, wherein the cluster of terminals 6 may be placed remotely from the host computer by means of a high speed composite transmission line 18 coupled between a local statistical multiplexer unit 12 and a remote statistical multiplexer unit 16. The statistical multiplexer units 12 and 16 provide data concentration and time division functions. Basically, statistical multiplexers fan out into the same number of logical lines in the computer as there are physical lines at the terminal end of the arrangement. Thus, while greater distances, typically those associated with modem transmission lines, can be accommodated between the opposite ends 12 and 16 of the statistical multiplexer, the number of lines in cable 14 routed to the computer interface 4 is the same as that of cable 8 described earlier, and the only line saving is in the reduction of the number of lines between the two halves of the statistical multiplexer function. As will be explained later in connection with FIG. 4, the present invention is functionally and structurally distinguished in concept from that of a statistical multiplexer, in that the computer interface is a part of the complete communication control apparatus, and as such it functions as a host adapter having the intelligence to know the protocol defined in the link interface and implementation in the node. Thus, the host adapter is able to communicate directly with the computer processor bus without fanning out to an equivalent number of lines as is the case with prior art computer interface schemes.

Figure 3:
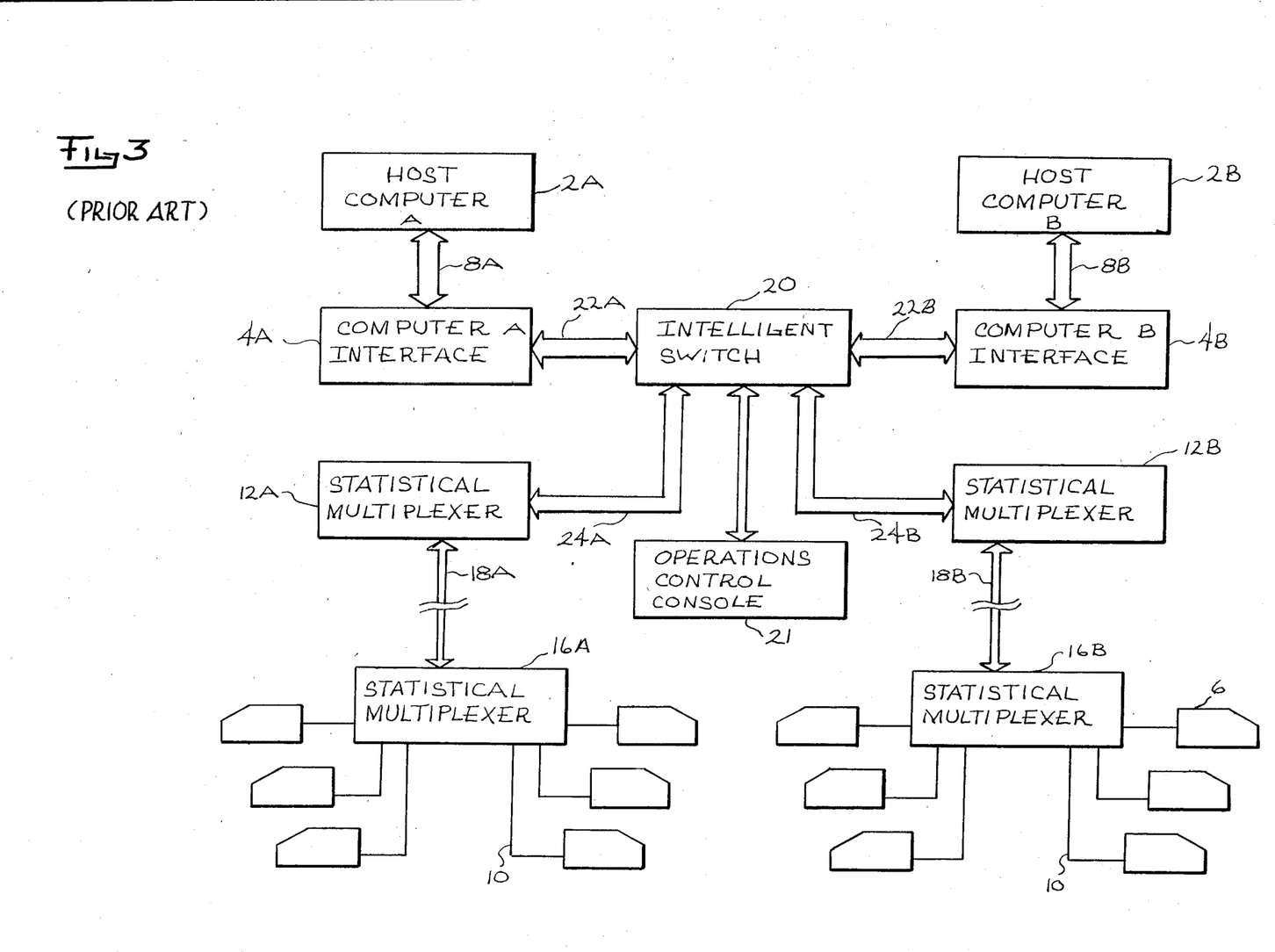
FIG. 3 is a prior art arrangement of a typical intelligent switch for communicating between separate groups of terminals and separate host computers.

FIG. 3 is another prior art arrangement, more sophisticated in that two groups of terminals 6 are connected through an intelligent switch 20 to a pair of host computers 2A and 2B. Shown in FIG. 3 is the typical statistical multiplexer arrangements 12A, 16A, and 12B, 16B having data links 18A and 18B, respectively, for coupling the data to and from the groups of terminals to multi-line cables 24A and 24B, respectively. Cables 24A and 24B are routed through intelligent switch 20 and selectively coupled to cables 22A and 22B for communicating with computer 2A or computer 2B interfaces 4A and 4B, respectively. The computer interfaces 4A and 4B are connected in a typical manner through cables 8A and 8B to their respective host computers 2A and 2B. By routing all terminal connections through the single intelligent switch 20, the users at terminals 6 can connect to their choice of host computer 2A or 2B, while an operations manager operates operations control console 21 to control the load on the system with a degree of network control. Normally, intelligence switch 20 is illogically located in the computer room, distant from the terminals.

Figure 4:
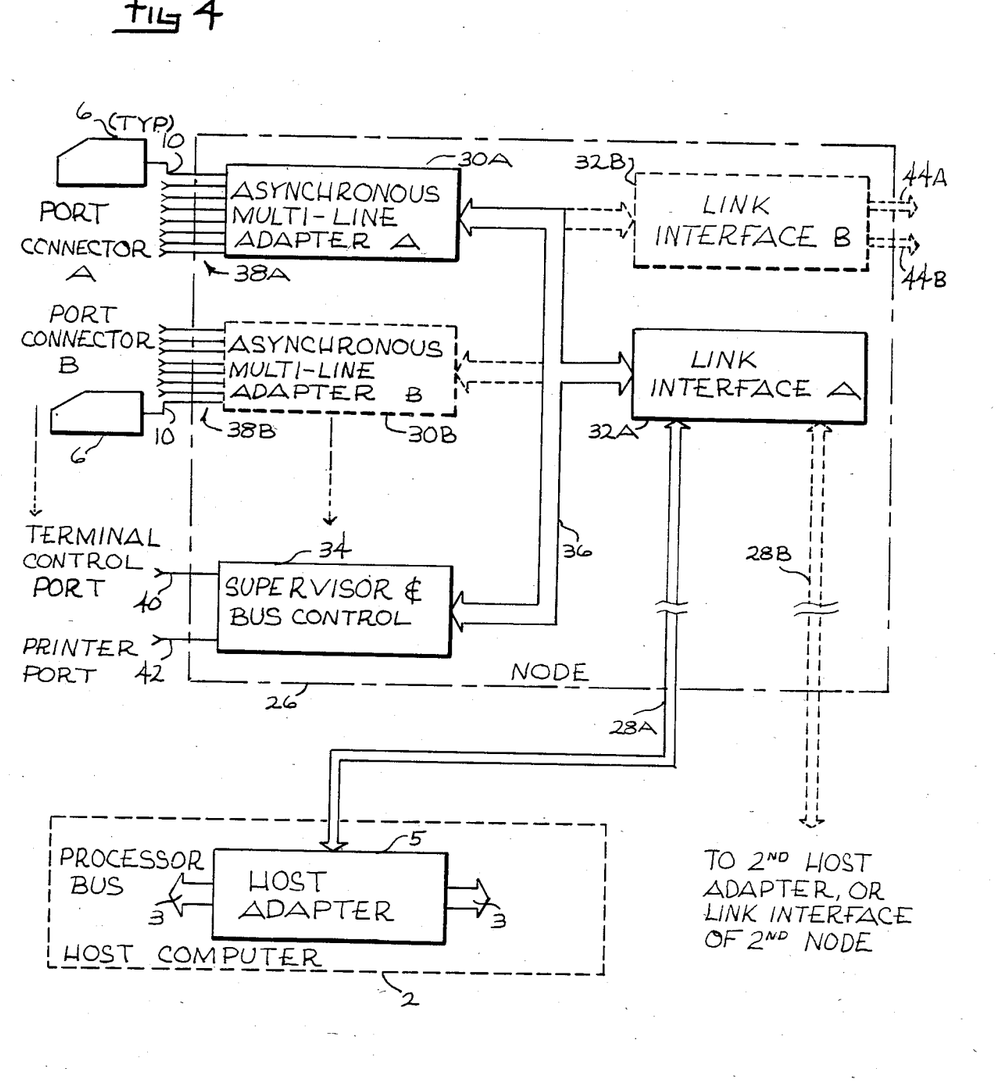
FIG. 4 is a functional block diagram of the communication control apparatus according to the present invention showing a node for connection to a plurality of terminals and a host adapter resident in the host computer and separated from the node by a high speed composite link.

The basic building blocks of the present invention are shown in FIG. 4. A plurality of terminals 6 are connected via terminal ports 10 to an asynchronous multi-line adapter 30A. Shown in FIG. 4 is the possibility of a number of asynchronous multi-line adapters 30A, 30B, and up to, preferably, 8 multi-line adapters for each node 26. Node 26, which may be defined as a programmable electronic switch, is coupled to the computer interface (shown in FIG. 4 as host adapter 5) via high speed composite link 28A.

With each asynchronous multi-line adapter 30, preferably communicating with 8 terminal ports 10, and with, again preferably, 8 asynchronous multi-line adapters 30, each node 26, in a typical system, can support up to 64 terminal connections. With the data transmission being communicated over high speed composite link 28A, the node 26 may be placed as far away as 1 kilometer from the host adapter 5.

Two of such nodes 26 may be interconnected to a single host adapter for a maximum of 128 terminal support, or a single node 26 may be connected to two host adapters 5 via the separate high speed composite links 28A and 28B.

Link interface 32A provides a data path between the local communication bus 36 and the high speed composite data transmission line 28A.

With the addition of an optional second link interface 32B, two additional high speed composite links 44A and 44B are available, each being connectible with a second host adapter or with a link interface of a second node. A supervisor terminal control port 40 and a printer port 42 in the node 26 permit on-line configuration capability with a hard copy log of all connections.

With the configuration shown in FIG. 4, each terminal user has access to at least two computers, and to a number of remote computer systems when the full capability of the communication control apparatus is implemented, i.e. when the optional high speed composite links 28B, 44A, and 44B are routed to additional remote host computers or to remote link interfaces of other nodes 26, respectively.

The operator terminal control port 40 allows the systems manager to define and alter the number of ports attached to each digital device and to allocate on-line terminals to ports on a one-for-one basis, thereby dynamically controlling the number and type of user on the system. Coupling the multi-line adapters to the common local communication bus 36 permits the terminal users to "talk" to each other or to a remote computer system without having to connect to the host computer 2. By allowing the nodes to be placed up to 1 km from the host adapter 5, the node 26 may be placed where it is logically needed, i.e. in the telephone room, in a terminal cluster area, or in any other preferable location, thereby reducing the need for short-haul modems, statistical multiplexers, and a substantial amount of cabling. As previously mentioned, the intelligent switch 20 of FIG. 3, of necessity, must be placed in the computer room remote from the terminal area.

When the optional high speed composite links 28B, 44A, and/or 44B are interconnected to the link interfaces of additional remote nodes 26, the two interconnected nodes serve clusters of terminals in remote sites under the control of a single supervisor through one of the supervisor terminal control ports 40.

Utilizing the supervisor terminal control port 40, the manager has the ability to dynamically configure and control the network. For example, with the configuration depicted in FIG. 4, the manager can reconfigure the network by assigning terminals to different ports. The nodes can be polled to identify the type of multi-line adapter 30 and the number of them. The status of any self-test diagnostics in both the node and the host adapter can be checked. Finally, the manager can enable or disable ports and/or terminal connections to restrict acess to the system.

An additional function of the system lies in the fact that the supervisory port 40, while not on the data path, is a standard RS232 port and, therefore, may be controlled remotely from a comercially available support center or from any terminal on the system, provided that at least one terminal/port is permanently connected to the supervisor port 40 and that the operating system in use permits privileged users to communicate with other terminals.

One of the major disadvantages with any system that concentrates a large number of lines into a single point is the magnitude of the problems that occur with a hardware failure. The present invention minimizes the effects of hardware failure by permitting a high degree of redundancy and by the unique supervisory control possibilities. With two high speed composite links 28A and 28B available, two host adapters 5 in computer 2 may be connected to a single node 26. The two host adapters 5 may be used in a single computer (to provide redundancy in the event of failure of one host adapter 5) or on separate systems to provide redundancy for terminal users in the event of a computer failure. In the event that a data channel into the system becomes "hung-up," a supervisor can relocate a terminal user to another port without "dropping the line."

Any computer system that permits access from remote terminals is subject to abuse and often, on most operating systems, even the password facility is not enough to deter the clever computer thief. However, with the present invention, the operations manager, through control port 40, may "lock-out" those terminal connections not in use by merely not assigning them a port, thereby making the system more secure. Additionally, the printer port records all configuration changes and requests for change, enhancing the security aspects of the system.

Link interface 32A establishes a specific type of signal protocol and effects signal conditioning which makes it possible to transreceive over the high speed composite link 28A. The composite link 28A uses a full duplex, bitserial, protocol dependent interconnect scheme.

The supervisor and bus control 34 scans and polls the devices within the node 26 and performs the switching functions for the communication control apparatus. In contrast to the functioning of the intelligent switch 20 shown in FIG. 3, the cost of which is often many times that of the computer itself, the supervisor and bus control 34 can perform functions heretofore not possible because of its position within the node 26 and its proximity to the local communication bus 36. Accordingly, instead of a terminal 6 signing on directly to one of the host computers 2 (assuming that the second composite link 28B is connected to a second host adapter in a second host computer), it signs on to the supervisor and bus control 34 and requests access to whichever host computer 2 it desires. The supervisor and bus control 34 then establishes the appropriate connection to whichever link 28A, 28B is appropriate, and then all transfers occur directly without intervention.

Figure 5:
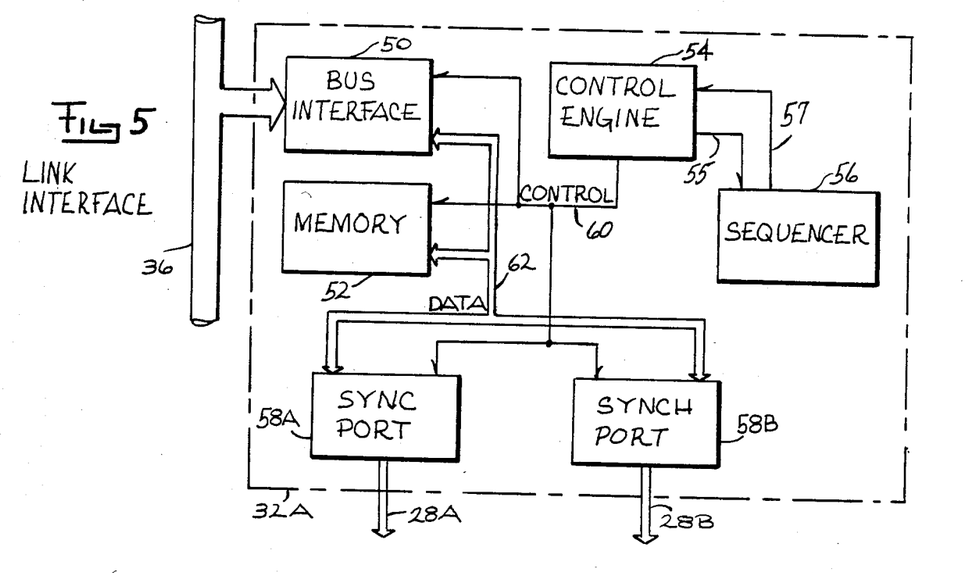
FIG. 5 is a block diagram of the link interface of FIG. 4.

FIGS. 5–9 represent the inner functions of the blocks shown in FIG. 4. FIG. 5 is the link interface 32A showing the local communication bus 36 coupled to bus interface 50. The local communication bus interface 50 provides the data path and control signals required to transmit information between components within a node, i.e. between the multi-line adapters 30, link interfaces 32, and supervisor and bus control 34. Memory 52 provides storage for, and checking of, data messages and device status information and is used to allow for the routing of information between one point in the system and another. The control engine section 54 provides the on-module timing control and data movement sequencing to accomplish transfers within the node and to the external environments.

Sequencer 56, via interconnect lines 55 and 57, provide the information necessary for the engine section to determine which work must be accomplished and in what priority order within a given node.

The synchronous ports 58A and 58B provide the communication path between the link interface 32A and the host adapter 5, or between the link interface 32A and expansion node 26 (not shown). The two synchronous ports 58A, 58B are data movement devices (serializers) for the high speed composite link 28A.

The control routing within link interface 32A is coupled to the internal modules over control line 60, while data is shown coupled over cable 62. Although the control line 60 is shown as a single line in FIGS. 5–8, it is to be understood that multiple control lines are inferred, and the single line designation is to distinguish the control lines from the data lines which are more conventionally drawn with double lines.

Figure 6:
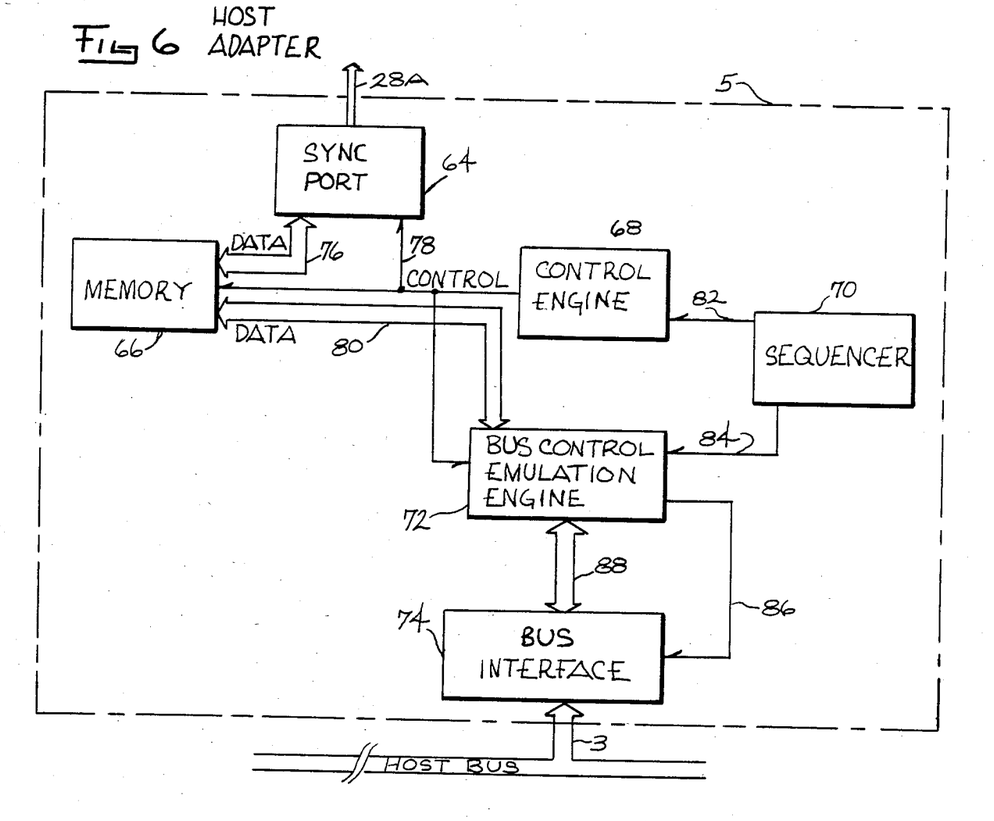
FIG. 6 is a block diagram showing the internal working of the host adapter shown in FIG. 4.
Figure 7:
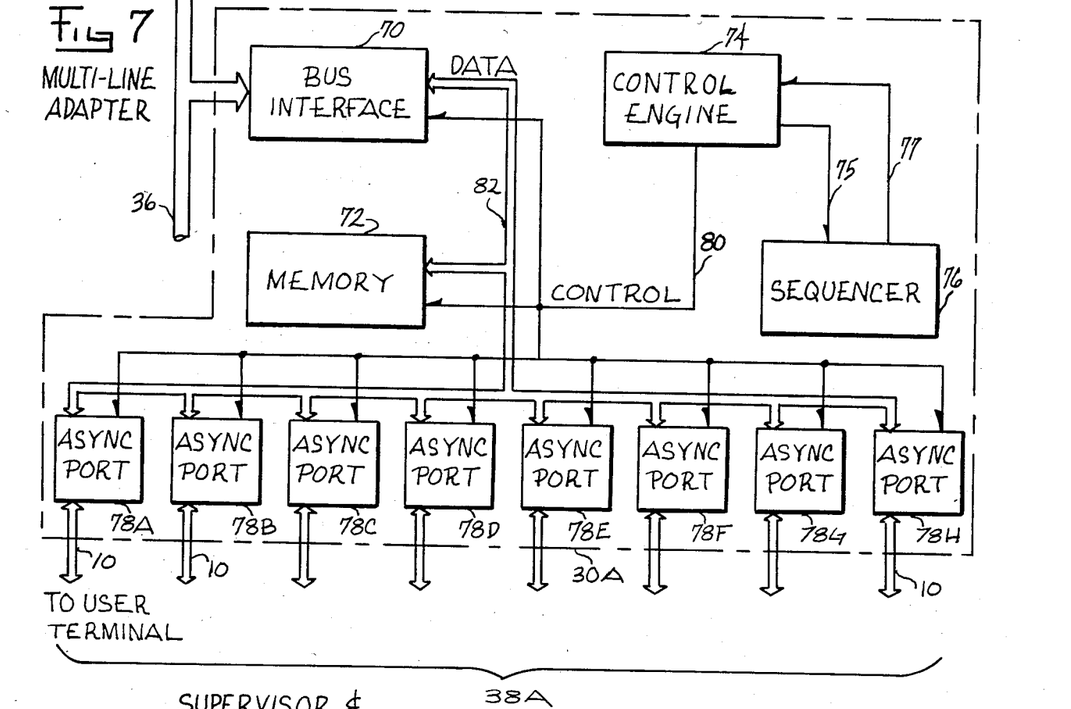
FIG. 7 is a block diagram of the function of the asynchronous multi-line adapter of FIG. 4.

Host adapter 5 shown in FIG. 6 has a synchronous port 64 functioning similar to that of synchronous port 58A, as well as a control engine 68 and sequencer 70 functioning comparable to the control engine 54 and sequencer 56 shown in FIG. 5. Sequencer control is effected over lines 82 and 84, the latter coupled to the bus control emulation engine 72. Emulation engine 72 provides the characterization of the host adapter 5 to allow it to look to the host processor as a specific product device type. It comprises the control registers that communicate with the host computer as well as the data paths between the host computer and the host adapter. In this connection, bus interface 74 fed by multi-line cable 88 and control line 86 is the electrical interconnect to the host peripheral bus 3.

A memory 66 processes the data on lines 76 and 80 under control of control engine 68 via line 78.

Each 8-port asynchronous multi-line adapter 30A (FIG. 7) is configured similarly to the link interface 32A, with the exception that the two synchronous ports 58A and 58B are replaced by eight asynchronous ports 78A through 78H. Having the same functions as in FIG. 5, each multi-line adapter contains a bus interface 70, memory 72, control engine 74, sequencer 76, interconnect lines 75, 77 between the sequencer 76 and control engine 74, with control lines 80 and data lines 82. The asynchronous ports 78A-78H are coupled to the user terminals 6 via individual terminal ports 10.

Figure 8:
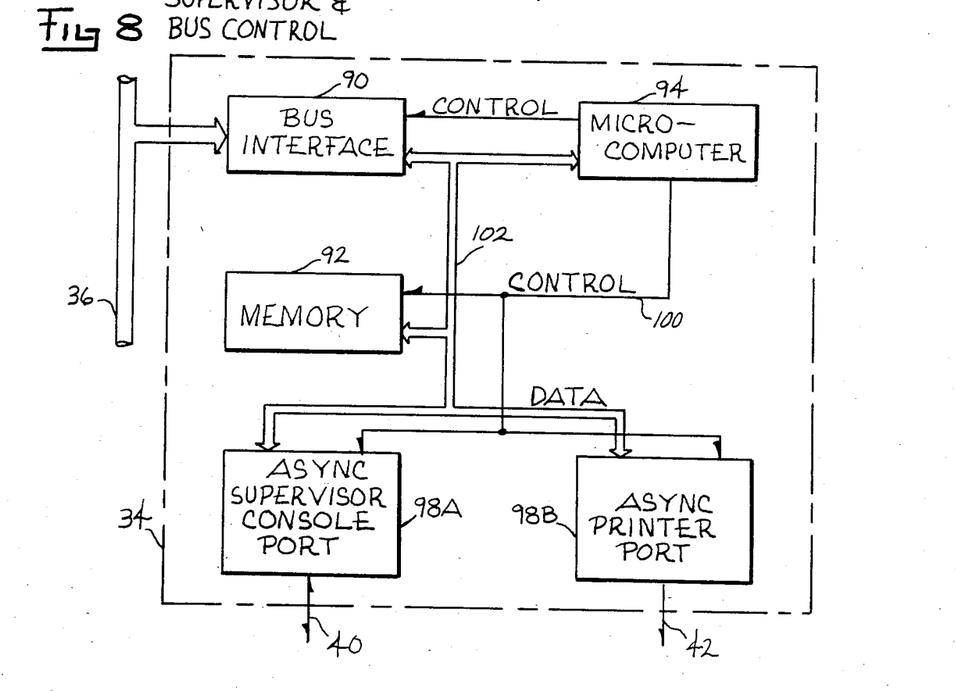
FIG. 8 is a block diagram of the supervisor and bus control device of FIG. 4.

The supervisor and bus control device 34, shown in FIG. 8, is structured similarly to the link interface of FIG. 5, with the exception that the synchronous ports 58A and 58B are replaced by asynchronous supervisor console port 98A and asynchronous printer port 98B, and the engine control 54 and sequencer 56 are replaced by a microcomputer 94. A bus interface 90 and memory 92 with interconnected control lines 100 and data lines 102 for the functional blocks within the supervisor and bus control 34 are also of similar function with the exception that the data line from asynchronous supervisor console port 98A carries routing information.

The asynchronous supervisor console port 98A inputs routing information to the module from terminal control port 40. The printer port 42 allows for hard copy listings of routing information through asynchronous printer port 98B. Memory 92 receives routing information from the supervisor console port and the microcomputer. In this connection, the microcomputer provides the interactive environment with the supervisor terminal and the routing tables in memory.

Figure 9:
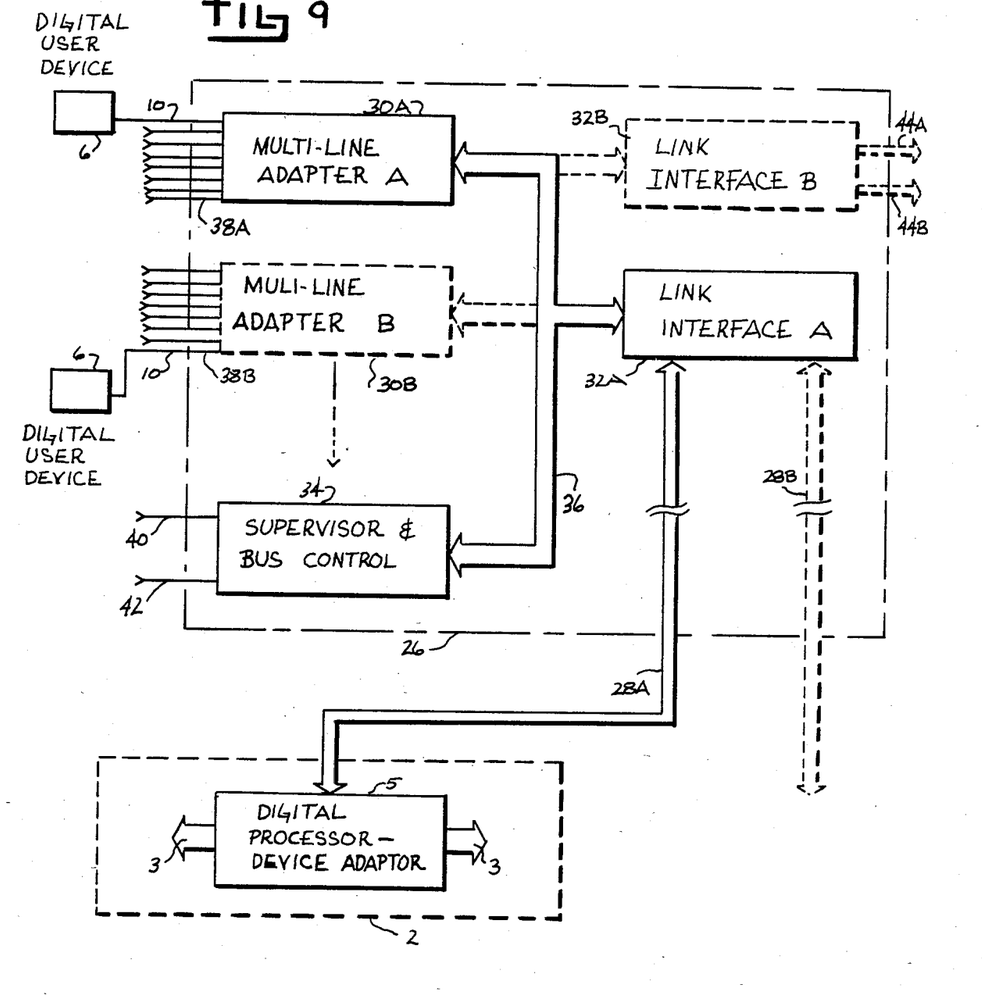
FIG. 9, similar to FIG. 4, shows the communication control apparatus for coupling between user digital devices and a remote digital processor device adapter.

FIG. 9, like FIG. 4, shows the communication control apparatus connectable between a number of user digital devices and a remote digital processor-device 2. This figure illustrates a broad application for the invention, wherein the fundamental concept involves a communication control apparatus for transferring messages between digital devices of any type: synchronous, asynchronous, serial, parallel, and characterized by any protocol. Under management of the supervisor and bus control 34, a message arriving at any input port 38A, B is routed through the node 26 to digital processor-device adapter 5 which, in turn, connects over bus lines 3 to remote digital processor 2. The communication protocol over links 28A, B or 44 A,B is unique to the invention, since connections to the outside world are electronically isolated by adapter(s) 30 and adapter 5. It is simply the function of the arrangement of FIG. 9 to electronically connect one attached port to another attached port under predetermined mapping programming or upon demand in a dynamically oriented configuration. Information movement through the invention need not be considered limited to bidirectional mapped connections between ports 38 and bus 3. As mentioned infra, a data message from digital user device 6 may be routed through multi-line adapter 38A to link interface 32A and over data link 28A to adapter 5 and on to the remote digital device 2 over bus 3. Alternatively, if desirable, the incoming message from one digital user device 6 may be routed to another of the input ports 38A, B to a second (or more) digital user device 6. The latter type connection is useful when, for example, one personal computer wishes to communicate with another personal computer (electronic mail, electronic interoffice memo files, and the like), while the former connection would be a typical connection between a keyboard terminal and one or more main frame computers.

It is not uncommon to find a network of computers and/or input and output devices and terminals in even small organizations. These small systems are interconnected by short-length cables and good signal transmission is possible between devices in the same room or even in rooms a few hundred feet apart. However, as organizations grow, computer systems grow, and just as management of small organizations must be completely restructured in order to operate efficiently under a larger organization environment, not surprisingly, the computer system must undergo similar growth-related restructuring. That is, larger computer systems for expanding organizations with more and varied demands cannot satisfy those demands by merely expanding input/output ports, memory sizes, the number of terminals, and the like. On the contrary, when computer systems expand beyond a certain limit, a totally different set of requirements are placed on the system, creating a myriad of network interconnect communication problems for the system designer. As the mainframe computers, terminals, and other devices get further apart (up to one kilometer and beyond), standard cable interconnect systems are useless, due to the noise pickup, grounding loops, signal degradation, and, from a practical viewpoint, the amount of cabling that is required.

When a small number of lines from one device are routed to another within the same room, a relatively inexpensive multi-line cable can provide the proper interconnect. Intelligent switches might also be incorporated to permit several devices within the same room to communicate along certain mapped paths, and again, the aggregate line length for the interconnect cables may not be objectionable.

For a large number (e.g., sixty-four and more) of lines and/or for long-length interconnects between several devices, of up to about one kilometer, the problems which the present invention addresses begin to emerge. First, the short-haul modems and statistical multiplexers begin to appear at virtually every localized area, and for a large computer system, the multiplicity of modems and statistical multiplexers has the appearance of a patchwork "fix". That is, employing modems and statistical multiplexers treats the symptoms, but does not cure the disease. It can be appreciated that, by the necessity of breaking into each line connected to a device, the number of cables would actually increase, and the number of connection points more than doubles, thereby substantially increasing failure rates for the interconnect system and lowering reliability, all resulting in more down time for the system. Moreover, if any redundancy is built into the system, the problem is even more magnified. These factors are, of course, totally independent of the obvious factors such as the great costs for the peripheral line driving/receiving devices.

In order to interconnect under some kind of intelligent terminal control, intelligent switches have been incorporated which permit the selection of certain limited communication paths between devices, but they do not help in reducing the number of lines involved in a large system. The further advent of local area networks has made some impact on reducing the number of lines in the system, but these devices have other drawbacks as will be discussed later.

Figure 10:
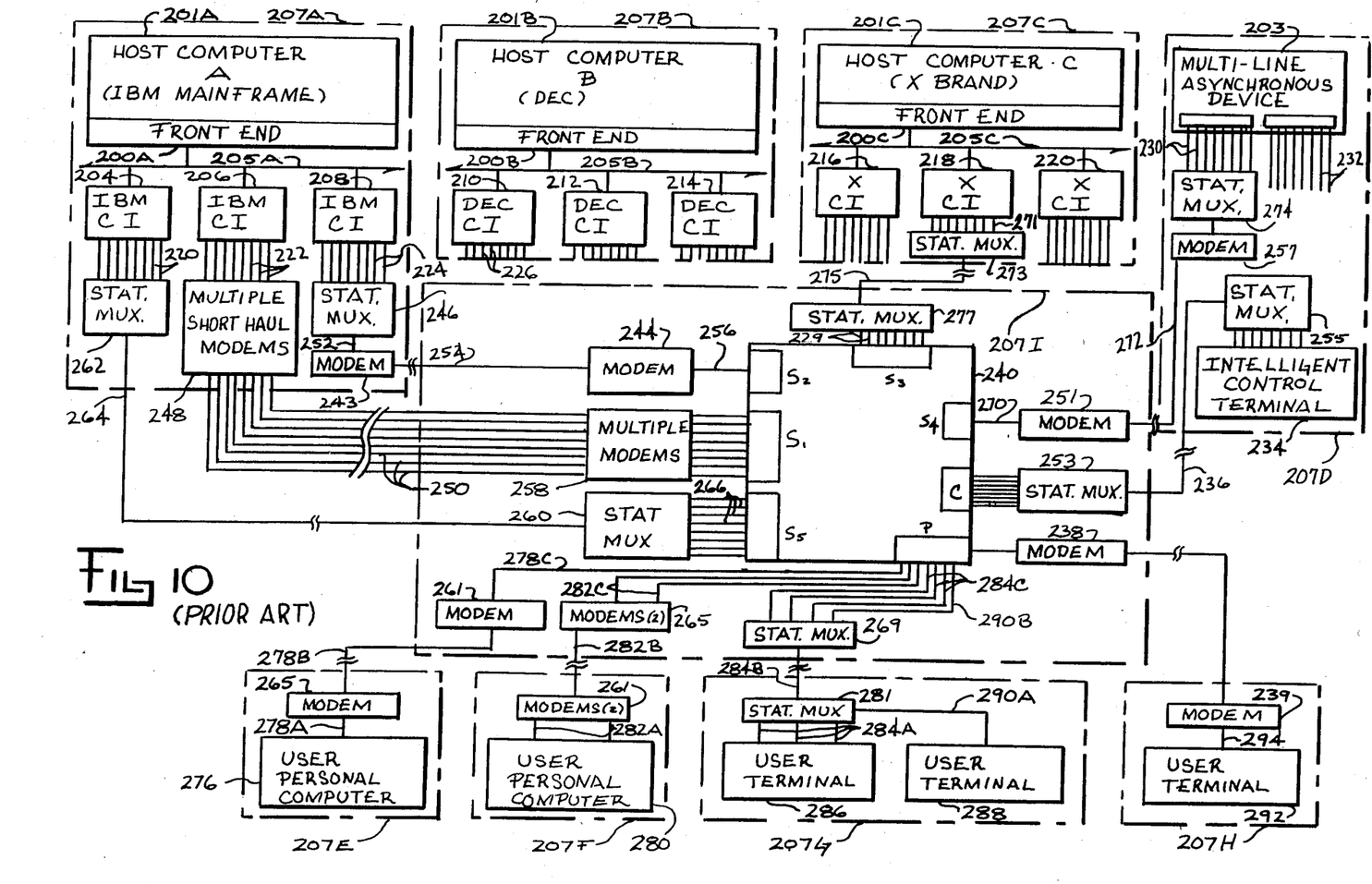
FIG. 10 is a prior art computer interconnect system using known statistical multiplexers, intelligent switch, and short haul modem devices.
Figures 11, 13:
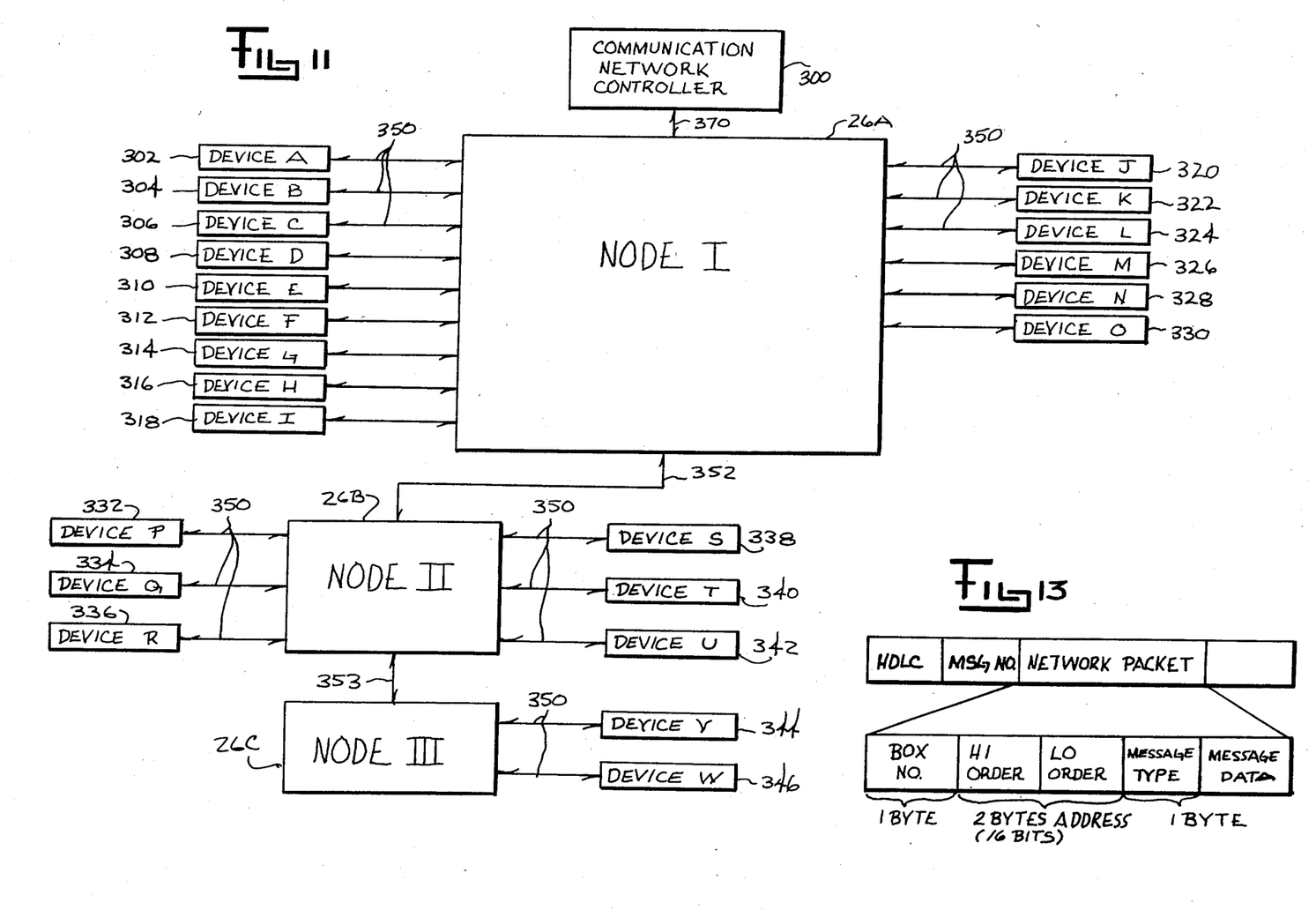
FIG. 11 is a generalized interconnect scheme between a number of digital devices, using the nodes and distribution scheme according to the present invention.
FIG. 13 shows the configuration of a message unit used in conjunction with the present invention.
Figure 12:
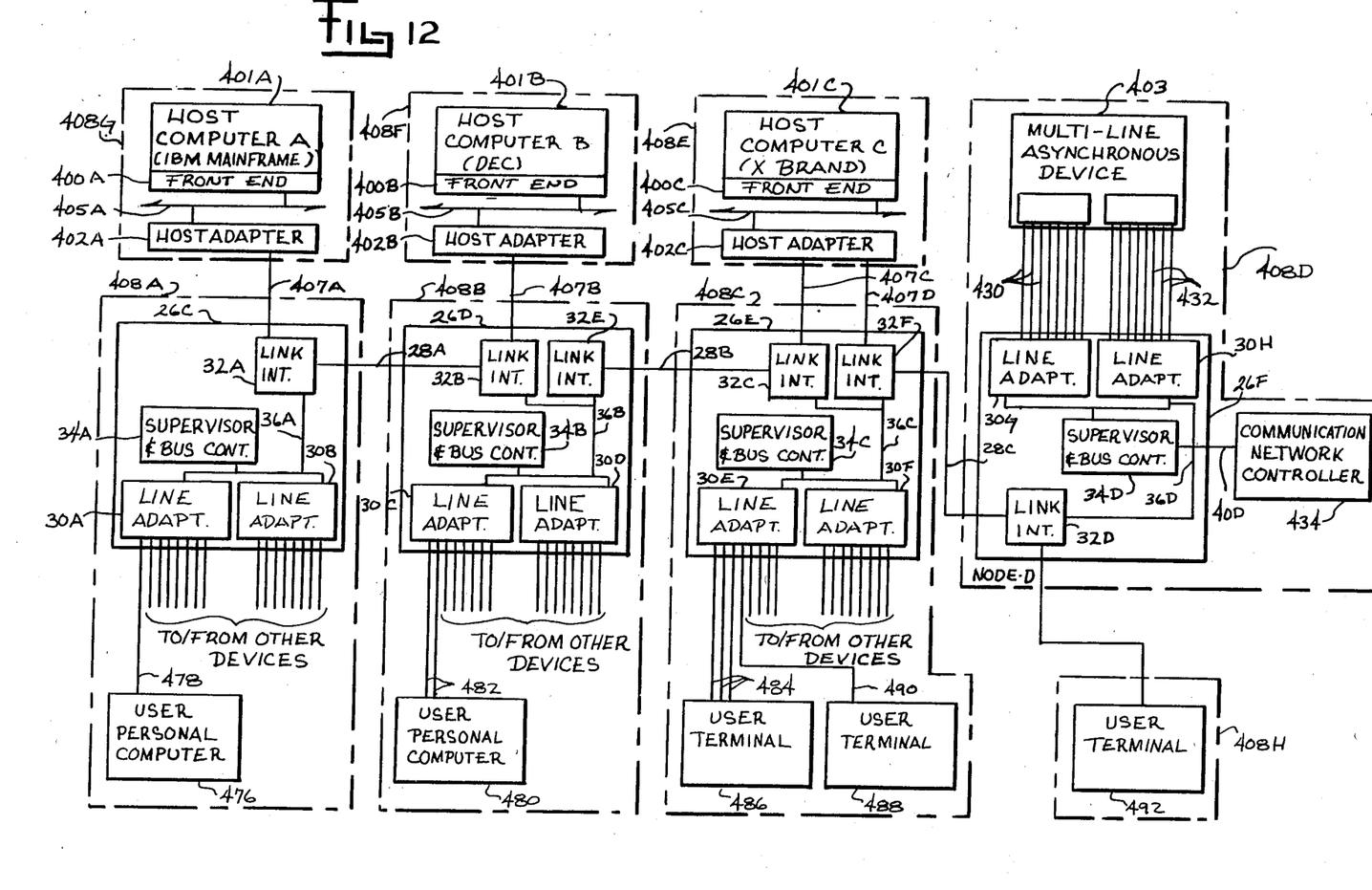
FIG. 12 shows the same system depicted in FIG. 10, but interconnected using the concepts of the present invention in substitution for the interconnection possibilities with known apparatuses.

In FIGS. 10-12, an illustration of the impact that the present invention has on a moderately complex computer system will be evident. FIG. 10 represents the "before" network configuration; FIG. 11 shows an idealized and simplified functional application for the invention; and FIG. 12 represents the "after" configuration of the digital device network of FIG. 10.

FIG. 10 is a representation of a prior art interconnect scheme for a portion of a large computer system with certain localized geographical locations identified as separate areas 207A-207I. The devices enclosed in each box 207X indicates that these devices are all located within a short distance of one another, e.g., within the same room. The separate geographical locations 207A-I are separated by distances of as much as one kilometer or more. This would be the case where the mainframe computers 201A, 201B, and 201C are located in different buildings of a campus-like arrangement for a large corporation. Similarly, a representation of a multi-line asynchronous device is shown at 203 in FIG. 10. The figure shows an intelligent control terminal 234 that is located in the same geographical area as the multi-line asynchronous device 203. Moreover, the system shown in FIG. 10 has the character of a localized area network by the fact that location 207I is shown separate from all of the other areas, including the intelligent control terminal 234. User devices 207E-H represent typical personal computers or user terminals, each again located at a long distance from its neighbor. User terminals 286 and 288 are shown, however, located in the same geographical area 207G.

The complex interconnect scheme of FIG. 10 represents the state of the art before the advent of the present invention. As suggested earlier, the system performs functionally in order to satisfy two important requirements for large computer systems, namely, the ability to communicate between devices located long distances apart, and the need for one device to communicate with more than one destination by the use of the intelligent switch 240. However, there are a number of disadvantages and drawbacks from the use of such a complex system in addition to the obvious, and aforementioned, large number of lines in both the computer room (housing one or more of the host computers 201A-C) and at the location 207I of the intelligent switch 240. These disadvantages will be discussed after a short recitation of the operation and limitation of the system shown in FIG. 10.

Each host computer 201A-C, which may be an IBM mainframe computer, Digital Equipment Corporation VAX machine, or any other mainframe computer ("X" brand), has what can be referred to as a front end 200A-C which one skilled in the art recognizes as that part of the computer that communicates with a processor bus 205A-C, which in turn communicates with a series of input/output ports referred to as computer interfaces 204, 210, 216, etc. The IBM computer interface 206 shows a plurality of asynchronous lines 222 routed to a corresponding plurality of short-haul modems 248 which have corresponding output lines 250 exiting the local area 207A. At the local area network location 207I, the receiving multiple modems 258 translate the same number of input lines to standard asynchronous computer lines entering port S1 of intelligent switch 240. The modems 248, 258, are, of course, necessary in order to transmit over the long distance between the discrete local areas 207A and 207I.

As an alternative to expensive short-haul modems in quantity, a statistical multiplexer 246 may be used, shown coupled to asynchronous lines 224 from IBM computer interface 208. In this example, the output of statistical multiplexer 246 is routed over a short single line 252 to modem 243, and the long line 254 is received by modem 244 in local area 207I. The output of modem 244 is applied by line 256 to port S2 on intelligent switch 243.

The reason for using modems 243, 244 lies in the fact that certain statistical multiplexers 246 are not capable of driving long lines. Long line drivers are available for certain statistical multiplexers, and this is exemplified in FIG. 10 as statistical multiplexer 262 which drives the long line 264 with a built-in line driver (not shown), and the receiving statistical multiplexer 260 translates the information on single line 264 back to the multiple asynchronous lines 266 applied to port S5 of intelligent switch 240.

Host computer 201B can be coupled to the system in the same manner as computer 201A or in any other known communication configuration. However, it is shown with its asynchronous lines truncated merely to avoid complicating an already complex drawing in FIG. 10. Host computer 201C merely shows another example of a long line statistical multiplexer arrangement showing multiplexers 273, 277 interconnected by long line 275. The single information line 275 is converted by multiplexer 277 to asynchronous lines 279 applied to port S3 of intelligent switch 240.

Multi-line asynchronous device 203 may be any of a variety of digital equipment devices which output multiple asynchronous lines, shown in FIG. 10 as a pair of multi-line cables 230 and 232. Multiplexer 274, modem 257, long line 272, modem 251, and line 270 applied to port S4 of intelligent switch 240 complements the signal path from the IBM computer interface 208 to the intelligent switch 240 port S2. An intelligent control terminal 234 likewise uses a statistical multiplexer 255 capable of driving a long line 236 without modem assistance, and the mutliplexer 253 applies the asynchronous multi-line signals to control port C of intelligent switch 240. In the case of need, and equally as applicable to the system, cables 230 and 232 can be synchronous lines.

User personal computers 276 and 280 use modems 261, 263, and 265, 267, respectively, to communicate over lines 278C and 282C to the primary port P of intelligent switch 240.

User terminals 286 and 288 are connected with their multi-line cables 284A and 290A to multiplexer 281 which communicates over line 284B to multiplexer 269 connected to primary port P of intelligent switch 240 over lines 284C and 290B. User terminal 292 uses standard modem transmission to the principal port P.

Because of the large number of alternatives possible in any computer system, as is evident by the cumbersome abundance of communication lines in FIG. 10, only single lines are drawn to represent communication channels between the boxes of FIG. 10. It should be understood, however that all lines are prospective bidirectional signal lines. Furthermore, the communication lines between devices may be of the asynchronous or synchronous type, and for ease of describing the invention, it will be assumed that all of the lines to be controlled by intelligent switch 240 are asynchronous in nature. However, the invention is not to be limited by the choice of example to be discussed in this description.

As to the general problem of permitting long-distance communciation between devices, the prior art arrangement of FIG. 10 accomplishes that goal. As can be seen, however, the requirement for a large number of mainframe interfaces and associated multi-line cable harnesses presents a formidable problem for the installing technicians, the installation effort being geometrically proportional to the number of lines to be installed. The same can be said at the local area 207I where all of the cables must be interconnected for intelligent port switching by switch 240. In this connection, one severe limitation to the system of FIG. 10 lies in the fact that intelligent switch 240 can connect any primary line of port P to any secondary line of ports S1-S5. However, the secondary ports S1-S5 may not be interconnected to communicate with each other.

A further disadvantage of the system of FIG. 10 can be understood by recognizing the limitations of a statistical multiplexer, insofar as time-sharing the signals along a single line is concerned. Typically, statistical multiplexers operate at an information rate of 9600 baud, and since this rate is comparable to the abilities of the devices themselves, time multiplexing of the several inputs to a statistical multiplexer necessarily results in an inferior data communication rate. Thus, the throughput limitation of a multiplexer can impose a practical limit to the expansion of the system, even if the hardware and cabling problems can be resolved.

The present invention overcomes all of the disadvantages enumerated with respect to the prior art arrangement of FIG. 10 by eliminating the multiple line interconnect at the mainframe computer interfaces and by eliminating the need for statistical multiplexers and short-haul modems in communicating signals over long lines. Moreover, by more direct signal routing and with the use of a high speed transmission line over long distances, the overall data transmission rate of the system is not significantly impaired.

FIG. 11 illustrates a simplified, but functional implementation of the present invention suggesting the manner in which the problems associated with prior art interconnect networks have been solved. In FIG. 11, the boxes 302-346 can be any digital devices A-W, respectively, which have lines designated generally by the numeral 350 of synchronous or asynchronous format and of any protocol normally encountered in computer interconnect networks. The invention lies in the configuration and function of the individual nodes I-III shown as blocks 26A-C in FIG. 11. Typically, one node is associated with each local area geographical location identified in FIG. 10 as locations 207A-207I. The devices within each geographical location 207 are interconnected with the node proximate that location, and all nodes are interconnected via high speed transmission lines 352, 353, so that any device of the entire system may communicate with any other device of the entire system by passing its information through its associated node and on to the node associated with the device with which it wishes to communciate. Note should be made of the fact that there is an absence of the typical intelligent switch and its limitations. That is, with the arrangement of the present invention, there are no distinctions between primary and secondary ports, and any signal information mapping can be devised so that any device can communicate with any other device of the system. Of course, it is to be understood that the protocol of the two devices in communication with each other must be the same. However, insofar as signal transmission through the system is concerned, the protocol of the signal being transferred is not recognized by the individual nodes or has any impact on its functioning.

In further contradistinction to the prior art arrangement of FIG. 10, the system of FIG. 11 uses no statistical multiplexers or short-haul modems. The interconnect lines 350 may either be representative of a single transmission line or a cable of multiple synchronous or asynchronous lines. It should also be appreciated that for each digital device 302-346 which communicates with a node 26A-C over a long distance (on the order of up to 1 km), a device (host) adapter 5 (FIG. 4) will be coupled to the digital device at its geographical location, and the digital adapter will communicate with its corresponding node over a high speed composite link 28. Network control is effected by communication network controller 300 over cable 370. Lines 350 are typically short lines, typically under 30 meters, interconnecting the associated node with the devices within the same localized area as the node.

While FIG. 11 is exemplary of the concept of the present invention, FIG. 12 more closely approximates the implementation of the system of FIG. 10, while incorporating the concepts according to the present invention.

In FIG. 12, host computer mainframes 401A-C are located at locations 408G, F, and E, respectively, and as before, each mainframe computer is provided with a front end 400A-C to provide a communication connection to the processor buses 405A-C as before-described. The structural differences begin to become evident by the provision of host adapters 402A-C. In the broadest sense of the term, the communication interfaces 204-220 of FIG. 10 could be referred to as "host adapters". However, as opposed to the prior art communication interfaces which translate between the processor bus and multiple asynchronous communication lines, the host adapter 402A-C of the present invention couples the processor bus to a single high speed composite link 407A-C, and it is readily apparent that one of the primary disadvantages of the prior art communication distribution network has been eliminated, i.e., that of requiring a large number of lines and mainframe communication interfaces in the computer room.

While the host adapters 402A-C typically operate asynchronously and directly with the processor buses 405A-C, the high speed composite transmission links 407A-C operate synchronously with the link interfaces 32A-C of nodes 26C-E.

As indicated earlier, each link interface 32 communicates within its node 26 via a local ommunication bus 36. Each node 26C-E comprises a supervisor and bus controller 34A-C for controlling the data transmission within the node in which it is resident. A master supervisor and bus control 34D is located in node 26F and coupled to communication network controller 434. The master supervisor 34D is identical to supervisors 34A-C, but is programmed to make all of the mapping decisions for the system as a whole, while the individual supervisor blocks for the individual nodes controls the data on the bus of its own local communication bus.

Coupled to the local communication bus 36A-C of each node 26C-E are a number of line adapters 30A-F having relatively short asynchronous multi-line connections to user devices such as the user personal computers 476 and 480 over lines 478 and 482, respectively. User terminals 486 and 488 likewise are coupled asynchronously over lines 484 and 490, respectively, to four of the asynchronous lines of line adapter 30E.

It can thus be seen that by the use of three nodes 26C-E, the number of lines in the computer room are drastically reduced, while yet permitting communication between the computers, between any computer and any user device, and between user devices, over long transmission lines between the local areas 408A-H. The user computer and terminal devices are coupled to the nodes over short asynchronous lines without deleterious effects, due to the close proximity of each user device with its associated node in the corresponding local area 408. Data transmission through the system described to this point is either between the user device and the mainframe computer through a single link interface 32 or through the link interface to another link interface and then to the ultimate destination.

Shown in FIG. 12 are six interconnected link interfaces 32A-F, but the number of link interfaces that may be connected together are without theoretical limit, and the choice is a matter of design for the particular system of concern.

As so far described, the system of FIG. 12 indicates a single transmission line between the mainframe computers and the nodes, fanning out to a number of asynchronous lines to user computers/terminals. Locations 408D and 408H represent a converse situation in which a user terminal 492 communicates over synchronous data link 28D to link interface 32D of node 26F. The line adapters 30G and 30H of node 26F are then coupled over short lines 430, 432, respectively, to a multi-line asynchronous device 403. It should also be noted that the example using terminal 492 as the device correspondent with asynchronous device 403 was strictly arbitrary. Any of the other devices could be mapped to communicate with device 403. For example, user terminal 476 could be mapped to device 403 through the interconnection between link adapters 32A, B, E, C, F and D, respectively, and this without adding any hardware. Such "inverse" connection shows the extreme flexibility of the system according to the present invention where the decision as to the connection point for the node is merely a matter of choosing one of a number of available ports with which to couple each data line. Obviously, if more asynchronous lines than the sixteen shown in FIG. 12 for each node 26 are required, another line adapter 30 can easily be added, since the system lends itself to easy expansion through the use of the local communciation bus 36 for each node.

Another example of expanding the basic node is found in nodes 26D and 26E. A convenient practical design for a node would include a link interface with connection to two high speed composite data link ports and one connection to the local communciation bus 36. However, in case of need, a second link interface (another circuit board) can easily be added to the node 26D to provide a pair of link interfaces 32B and 32E, the former with two high speed data links 28A and 407B connected, and the latter with a single data link 28B for communicating with data link 32C of node 26E. In this configuration, node 26E also has two link interfaces 32C and 32F, but for different purposes. While interface 32C functions similarly to that of 32B, link interface 32F not only communicates to the further link interface 32D, but also is coupled over the long data link 407D to host adapter 402C to offer redundant capability for computer 401C. That is, by providing a pair of data links to host adapter 402C, in the event that one of the transmission paths from node 26E to computer 401C is faulty, the other link interface, under control of its local supervisor and bus control 34C will take over the function so as to keep computer 401C on line. It can be observed that the additional hardware necessary to provide full redundancy between node 26E and computer 401C is minimal as compared to that involving the horrendous task of providing redundancy to the same computer 201C of FIG. 10 which would clearly result in exorbitant costs and additional confusion in the cabling maze.

Not possible with prior art arrangements, it can now be seen that a user personal computer 476 can communication directly with another user personal computer 480 by the communication path over asynchronous line 478, line adapter 30A, bus 36A, link interface 32A, high speed composite transmission line 28A, link interface 32B, local communication bus 36B, line adapter 30C, and asynchronous lines 482. Assuming that the supervisor has prearranged this communication path between these two users, straight-forward communication between the two computers is possible even over a long transmission line (on the order of 1 Km), i.e., that extending between the two link interfaces 32A and 32B. It should also be noted that this data path is made possible without connecting to or affecting the communication path of the mainframe computers, and in addition is made possible without the need for a complex intelligent switch, without the additional complex of modems, and without being slowed down by the multiplexing process of a statistical multiplexer.

As alluded to earlier, one of the supervisor and bus control blocks 34D is designated and programmed as a primary supervisor, while all other supervisors 34A-C are secondary. The master supervisor 34D is predetermined when the system is assembled and initialized. Upon failure of the master supervisor to carry out its function, however, any one of the other supervisors (also prearranged) can take over the primary supervisory function. As a result, a portion of the system (multi-line asynchronous device 403) may be removed from the system, but the remainder of the system will remain intact. For example, supervisor 34C may be designated as second in priority and take over the function of the entire system upon failure of supervisor 34D. Through link interface 32F and 32D, even the user terminal 492 and asynchronous device 403 may continue to function without the assistance of supervisor 34D. Consequently, by the use of multiple link interfaces 32 and supervisory default programming, a substantial amount of redundancy can be built into the system without a lot of hardware.

Referring to FIG. 13, there is a unique address associated with each device making up the system. In this sense, a device is defined as a mainframe computer, an asynchronous device, a personal computer, a user terminal, a communication network controller, a node, and any other digital device that might be added to a typical computer system. Insofar as the host computers are concerned, it can be more accurately stated that the host adapters 402A-C are the devices which will have associated with them a particular device address, not the computers themselves. Although not limiting, a typical system may support 32 different device addresses.

Since the software of a computer identifies with the line numbers of a particular device with which it wishes to communicate, for each device there is preferably designated a number of virtual line addresses recognizable in a software sense. As an example, if computer 476 sends a request to line adapter 30A to communication with host computer 401C, after being interrogated by the supervisor 34A a determination is made by the supervisor 34A that the data path is to be continued through high speed data link 28A. This is a result of recognizing in the message sent to line adapter 30A that the device number is not that of host adapter 402A (with which node 26C is directly connected), nor any of the devices connected to the asynchronous lines connected to line adapters 30A and 30B. Upon reaching link interface 32B, the data is transferred to local communication bus 36B, and the same determination is made by supervisor 34B with similar results, i.e., that the appropriate data link 28B is to carry the message further onto link interface 32C. In a similar analysis, supervisor 34C recognizes that the device number is one for which it is to supply routing information, and the data is coupled to high speed composite line 407C (or alternatively, 407D in a redundancy mode) to arrive at host adapter 402C which holds the proper device number address. The message communicated to host adapter 402C also contains the virtual line address which will be used to route the information to the appropriate location in host computer 401C.

The message address unit of FIG. 13 is comprised of a protocol envelope, e.g. HDLC, a message number and a network message packet, all according to common message formatting. The network message packet is made up of a number of component parts. A box number (1 byte) serves as an identifier of the box (digital device) to which the message is to be sent. The high and low order (2 byte) address allow for a large number of addresses identifying the line (actual or virtual) number desired at that destination. Next is a 1 byte allocation for the type of message being sent, control function, diagnostic function, or data function. A control function message may set up desirable map coordinates or cause a message merely to pass through to another device. The diagnostic function may command a diagnostic test to be performed on the receiving device (system test), the sending device (self test) or any of a number of known diagnostic routines. The data function is, of course, the actual message structure.

When the message packet arrives at the supervisor and bus control 34, it is first inspected to determine if the box receiving it has the proper destination address. If not, the supervisor and bus control 34 function is to pass the message on to the proper destination. Assuming it is meant for the box that receives it, the message is put into memory 92 by microcomputer 94 which also determines what type of structure the message has, control, diagnostic, or data, and responds accordingly. The supervisor and bus control 34 also monitors the message and makes such determinations as good or bad message, no connection available, too long a time for destination device to respond, user not following protocol rules, etc. and takes alternative action as previously predetermined at the initialization of the system.

The message routed over the lines interconnecting the link interfaces does not need to be asynchronous. It could be synchronous, it could be X.25, and the electronics of the link interface and other blocks of the node are not sensitive to the difference. The entire function of each node is to recognize that a message is to be sent to a particular location; it then selects the proper routing path, under supervisory control, and transmits the information it receives.

The underlying concept of the invention does not change when the type of connection changes from asynchronous to synchronous (and vice versa), serial to parallel (and vice versa), although the hardware would, of course, have to be compatible.

As can be appreciated, the invention satisfies the goals set forth in the introductory portion to this specification by providing an improved computer/terminal communication control apparatus which is capable of sufficient functional flexibility to solve a variety of computer/terminal interface problems and at substantial savings. It has been demonstrated that the invention, by its unique supervisory control capability, reduces or eliminates manual patching systems. Since the node 26 may be located remotely, less computer room space is required. Significant reduction of wiring between the telephone room/terminal cluster and the computer room is evident, and short-haul modems, usually needed to connect the terminals to the computer room, are substantially reduced or eliminated. By tailoring each functional component to the specific task described herein, expensive and cumbersome general purpose off-the-shelf items, more powerful than is necessary for any specific requirement, are eliminated, resulting in the reduction of computer power, space, and bus loadings. With better terminal access to the computer systems, an improvement in work efficiency can be readily realized. Moreover, better up-time through redundant functional design is inherently characteristic of the improved system.

The fundamental concept of the invention lies in an apparatus for transferring digital messages in a network of interconnected digital devices, giving the user an almost inexhaustive matrix of interconnections for a large number of devices without the commonly encountered restrictions of placement of communication paths or direction of data movement. Over long distances, data integrity is maintained by the data links, and redundancy is achievable at a fraction of normal costs.

The invention is not to be likened to a local area network for the reasons given earlier. After description of the invention in detail, another shortcoming of the local area network is evident. Local area networks require the computers to which they are attached to have software adapted to the requirements of the network instead of the network adapted to the computer. If software compatible to the network is not offered by main frame vendors, the user has no capability to have a software transparent mechanism.

Thus, the invention defines a relatively simple, cost effective, software transparent method of interconnecting a moderate to large number of digital devices in a communication network.

While the invention has been particularly shown and described with reference to the preferred embodiments thereof, it will be understood by those skilled in the art that changes in form and details may be made therein without departing from the spirit and scope of the invention. Accordingly, it is not intended that the invention be limited except as by the appended claims.

We claim:

1. A communication control apparatus for interconnecting a plurality of digital devices in a digital data communication network, comprising:
    a local communciation bus for routing of digital data and control signals internally of said control apparatus;
    at least one digital data line adapter for transreceiving digital data on a corresponding line port coupled to a respective user digital device;
    means in said adapter for selectively applying said digital data to said local communication bus;
    a high speed data composite transmission link for transreceiving data between said control apparatus and a remote digital data processor;
    a link interface means at the local end of said composite transmission link for providing a communication path between said local communication bus and said composite transmission link;
    a digital data processor interface adapter at the remote end of said composite transmission link for communicating data between said high speed composite transmission link and a processor bus of said digital data processor; and a supervisor and bus control means at said local end of said composite transmission link for providing source and destination routing control of data on said local communication bus between said at least one line adapter and said link interface means.

2. The communication control apparatus as claimed in claim 1, wherein each of said line adapters are asynchronous.

3. The communication control apparatus as claimed in claim 1, wherein each of said line adapters are synchronous.

4. The communication control apparatus as claimed in claim 1, wherein said high speed data composite transmission link is a protocol dependent interconnect transmission line.

5. The communication control apparatus as claimed in claim 1, wherein said supervisor and bus control means includes first and second asynchronous ports, said first port having the function of a terminal operator control port, and said second port having the function of a printer output port for providing hard copy of said source and destination routing control data.

6. The communication control apparatus as claimed in claim 2, wherein:

said plurality of asynchronous line adapters are organized into a single asynchronous multi-line adapter unit, said multi-line adapter unit comprising said plurality of asynchronous line adapters and said means for applying said input data to said local communication bus.

7. The communication control apparatus as claimed in claim 6, including additional asynchronous multi-line adapter units, each additional multi-line adapter unit including a separate plurality of asynchronous line adapters and a separate means for applying the input data from said additional asynchronous line adapters to said local communication bus.

8. The communication control apparatus as claimed in claim 4, including a second high speed data composite transmission line for transreceiving data between said control apparatus and a remote digital device at the remote end of said second composite transmission line; and a remote digital device interface adapter at the remote end of said second composite transmission line for communicating data between said second high speed composite transmission line and a data bus of the remote digital device.

9. The communication control apparatus as claimed in claim 8, wherein said remote digital device is the link interface means of a similar one of said communication control apparatus.

10. The communication control apparatus as claimed in claim 4, including:

at least one additional high speed data composite transmission line for transreceiving data between said control apparatus and a remote user digital device; and a second link interface means at the local end of said second composite transmission line for providing a communication path between said local communication bus and said second composite transmission line.

11. The communication control apparatus as claimed in claim 4, including:

a digital processor comprising a store and forward means for storing data to be transmitted along said high speed data composite transmission line and for forwarding said data along said composite transmission line.

12. A communication control apparatus for interconnecting a plurality of digital devices in a digital data communication network, including at least one user digital device and at least one digital data processor with associated processor bus, said apparatus comprising:

a programmable electronic switch means for asynchronous connection to said user digital devices, and for synchronous connection to a protocol dependent data link;

a host adapter for asynchronous connection to the processor bus of said digital data processor, and for synchronous connection to said data link; and means in said switch means for controlling routing options and for dynamic reconfiguration of said connections within said switch means.

13. The communication control apparatus as claimed in claim 9, wherein said data processor is a digital computing device.

14. The communciation control apparatus as claimed in claim 11, wherein said store and forward means comprises circuit means for storing said data to be transmitted and for forwarding said data along said composite transmission line under control of said supervisor and bus control means.

15. A communication control apparatus for interconnecting a plurality of digital devices in a digital data communication network, comprising:

a local communication bus for routing of digital data and control signals internally of said control apparatus;

at least one digital data line adapter for transreceiving digital data on a corresponding line port coupled to a respective user digital device;

means in said digital line adapter for selectively applying said digital data to said local communciation bus;

a high speed data composite transmission link for transreceiving data between said control apparatus and a remote digital data processor;

a link interface means at the local end of said composite transmission link for providing a communication path between said local communication bus and said composite transmission link; and a supervisor and bus control means for providing source and destination routing control of data on said local communication bus between said line adapters and said link interface means.

* * * * *